US012201948B2

(12) United States Patent
Ebata et al.

(10) Patent No.: US 12,201,948 B2
(45) Date of Patent: Jan. 21, 2025

(54) UNSINTERED EXPANDED POLYTETRAFLUOROETHYLENE COMPOSITE MEMBRANES HAVING DIMENSIONAL STABILITY

(71) Applicant: W.L. Gore & Associates, Inc., Newark, DE (US)

(72) Inventors: Yuri Ebata, West Grove, PA (US); Todd S. Sayler, Bear, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 658 days.

(21) Appl. No.: 17/277,763

(22) PCT Filed: Oct. 4, 2018

(86) PCT No.: PCT/US2018/054326
§ 371 (c)(1),
(2) Date: Mar. 19, 2021

(87) PCT Pub. No.: WO2020/072058
PCT Pub. Date: Apr. 9, 2020

(65) Prior Publication Data
US 2021/0346848 A1 Nov. 11, 2021

(51) Int. Cl.
*B01D 67/00* (2006.01)
*B01D 69/02* (2006.01)
(Continued)

(52) U.S. Cl.
CPC ..... *B01D 67/0027* (2013.01); *B01D 67/0083* (2013.01); *B01D 69/02* (2013.01);
(Continued)

(58) Field of Classification Search
CPC .... D04H 1/43838; F16L 15/04; B01J 35/023; B29C 55/005; B01D 2323/08;
(Continued)

(56) References Cited

U.S. PATENT DOCUMENTS 3,664,915 A * 5/1972 Gore ............... F16L 15/04
260/DIG. 37
3,953,566 A 4/1976 Gore
(Continued)

FOREIGN PATENT DOCUMENTS

CN 103990387 A * 8/2014 ......... B01D 67/0027
CN 104245827 A 12/2014
(Continued)

*Primary Examiner* — Dirk R Bass (57) ABSTRACT

A method of forming an unsintered biaxially expanded PTFE/thermoplastic polymer composite membrane is provided. The method includes blending fibrillatable polytetrafluoroethylene (PTFE) particles and thermoplastic polymer particles where the melting point of the thermoplastic polymer particles is less than the melting point of the fibrillatable PTFE particles. The method further includes forming the blend into a tape and expanding and heating the tape in a first direction at a first temperature. The expanded tape is then expanded, either concurrently or sequentially in a second direction to form an ePTFE composite membrane. The method does not include a sintering temperature. The ePTFE particles and thermoplastic polymer particles have an average particle size of less than 1 μm. In addition, the ePTFE composite membrane has a geometric mean matrix modulus to geometric mean matrix tensile strength ratio of at least about 6 and an absolute dimensional change percentage of less than about 1.5%.

14 Claims, 6 Drawing Sheets (51) Int. Cl.
  *B01D 69/06* (2006.01)
  *B01D 69/12* (2006.01)
  *B01D 71/34* (2006.01)
  *B01D 71/36* (2006.01)
(52) U.S. Cl.
  CPC ............ *B01D 69/06* (2013.01); *B01D 69/12* (2013.01); *B01D 71/34* (2013.01); *B01D 71/36* (2013.01); *B01D 2323/08* (2013.01); *B01D 2323/12* (2013.01); *B01D 2325/24* (2013.01)
(58) Field of Classification Search
  CPC ............ B01D 2323/12; B01D 2325/24; B01D 67/0027; B01D 67/0083; B01D 69/02; B01D 69/06; B01D 69/12; B01D 71/32; B01D 71/34; B01D 71/36
  See application file for complete search history.

(56) References Cited

U.S. PATENT DOCUMENTS

| | | | | |
|---|---|---|---|---|
| 4,482,516 | A * | 11/1984 | Bowman | B29C 55/005 264/289.3 |
| 6,110,333 | A * | 8/2000 | Spethmann | C25B 13/08 204/252 |
| 6,127,486 | A | 10/2000 | Burger et al. | |
| 9,707,504 | B2 | 7/2017 | Chaen et al. | |
| 9,802,187 | B2 * | 10/2017 | Fu | B01J 35/023 |
| 2003/0049538 | A1 * | 3/2003 | Buerger | H01M 50/491 429/142 |
| 2013/0184807 | A1 * | 7/2013 | Kovach | A61F 2/82 428/196 |
| 2013/0197664 | A1 * | 8/2013 | Ballard | B01D 39/04 623/23.72 |
| 2015/0082757 | A1 | 3/2015 | Chaen et al. | |
| 2016/0075838 | A1 * | 3/2016 | Watanabe | D04H 1/43838 521/55 |
| 2016/0075914 | A1 * | 3/2016 | Dutta | B01D 67/0088 428/319.3 |
| 2017/0203552 | A1 * | 7/2017 | D'Arcy | B32B 5/026 |

FOREIGN PATENT DOCUMENTS

| | | | | |
|---|---|---|---|---|
| CN | 106659489 A | * | 5/2017 | ......... A61B 17/0057 |
| EP | 0633053 B1 | | 7/1997 | |
| EP | 0613921 | | 11/1999 | |
| EP | 1019238 | | 7/2000 | |
| EP | 2067814 | | 6/2009 | |
| EP | 2840115 | | 2/2015 | |
| JP | 1975-010343 A | | 2/1975 | |
| JP | 2010132712 A | | 6/2010 | |
| JP | 2016000817 A | | 1/2016 | |
| WO | WO-94/03531 A1 | | 2/1994 | |
| WO | WO-2016167815 A1 | * | 10/2016 | ............ B01D 29/05 |

* cited by examiner

UNSINTERED EXPANDED POLYTETRAFLUOROETHYLENE COMPOSITE MEMBRANES HAVING DIMENSIONAL STABILITY

FIELD

The present disclosure relates generally to expanded polytetrafluoroethylene (ePTFE) composite membranes that are dimensionally stable without sintering, and more specifically, to ePTFE composite membranes that include at least one thermoplastic polymer. Methods of producing such composite membranes are also provided.

BACKGROUND ePTFE membranes and ePTFE composite membranes may be subjected to at least one sintering step to improve dimensional stability prior to use. While a sintering step above the melting point of ePTFE has been known to provide ePTFE membranes with increased dimensional stability, sintering deleteriously affects the membrane by reducing crystallinity and increasing amorphous content. Membranes having amorphous PTFE often exhibit a rigid amorphous phase that has a transition temperature of about 120° C. Above this transition temperature, a sintered ePTFE article may have reduced mechanical properties. For example, sintering an ePTFE membrane adversely impacts properties of the membrane such as mean matrix modulus, a loss of dimensional stability over time, and a loss in crystallinity. It is desired by those skilled in the art to produce a dimensionally stable porous membrane derived from ePTFE without having to sinter the ePTFE, thereby losing crystallinity. As such, there is a need to provide ePTFE membranes and ePTFE composite membranes that are dimensionally stable over time at elevated temperatures, exhibit a high matrix modulus, and have a relatively high ratio of geometric mean matrix modulus to geometric mean matrix tensile strength.

SUMMARY

One embodiment relates to a method of forming an unsintered biaxially expanded ePTFE composite membrane. The method includes providing a blend that includes a first plurality of fibrillatable polytetrafluoroethylene (PTFE) particles having a first melting point and a second plurality of thermoplastic polymer particles having a second melting point that is less than the first melting point. The blend is then formed into a tape. Next, the tape is expanded in a first direction and then in a second direction that is different from the first direction (e.g., orthogonal) at a temperature less than the first melting point to form an ePTFE composite membrane. Expanding in the first direction may be performed at a temperature below than the second melting point, such as from about 170° C. to about 300° C. Expanding in the second direction may be performed at a temperature above the second melting point and below the first melting point, such as from about 280° C. to 327° C. The blend includes from 40 wt % to 79.9 wt % fibrillatable PTFE particles and from 20.1 wt % to 60 wt % thermoplastic polymer. The ePTFE composite membrane may have a geometric mean matrix modulus to geometric mean matrix tensile strength ratio of at least about 6. Additionally, the method may be devoid of a heating step above 327° C.

Another embodiment relates to a method of forming an unsintered biaxially expanded ePTFE composite membrane. The method includes providing a blend that includes a first plurality of fibrillatable polytetrafluoroethylene (PTFE) particles having an average particle size less than 1 μm and a second plurality of thermoplastic polymer particles having an average particle size of less than 1 μm. In exemplary embodiments, the average particle size of the thermoplastic polymer particles is the same as or smaller than the average particle size of the fibrillatable PTFE particles. In addition, the melting point of the thermoplastic polymer is less than the melting point of the fibrillatable PTFE particles. The blend includes from 40 wt % to 79.9 wt % of fibrillatable PTFE particles and from 20.1 wt % to 60 wt % of thermoplastic polymer particles. The method also includes paste extruding the blend with a lubricant to form a calendared tape, drying the calendared tape to remove the lubricant and produce a dried calendared tape, expanding the dried calendared tape in a first direction at a temperature below the melting point of the thermoplastic polymer to form a uniaxially expanded ePTFE composite membrane. The method also includes heating the uniaxially expanded porous ePTFE composite membrane to a temperature greater than the melting point of the thermoplastic polymer and less than the melting point of the fibrillatable PTFE particles and, either concurrently or sequentially, expanding the uniaxially expanded porous ePTFE composite membrane in a second direction, where the second direction is different from the first direction, to form a biaxially expanded ePTFE composite membrane. The temperature of the step of expanding in the first direction may be from about 170° C. to about 300° C. and the temperature of the heating step may be from about 280° C. to about 300° C. The step of expanding the membrane in the second direction may be concurrent with the step of heating. The method may be devoid of a heating step at a temperature at or above the melting point of the fibrillatable PTFE particles, such as above 327° C. The thermoplastic polymer may include poly(ethene-co-tetrafluoroethene) (ETFE), polyvinylidene difluoride (PVDF), polychlorotrifluoroethylene (PCTFE), fluorinated ethylene propylene (FEP), perfluoroalkoxy (PFA), and combinations thereof.

Yet another embodiment relates to an unsintered biaxially ePTFE composite membrane having a plurality of nodes and fibrils. The ePTFE composite membrane includes from 40 wt % to 79.9 wt % polytetrafluoroethylene (PTFE), from 20.1 wt % to 60 wt % thermoplastic polymer, and a geometric mean matrix modulus to geometric mean matrix tensile strength ratio of at least about 6. The fibrils primarily include ePTFE and the nodes contain the thermoplastic polymer in an amount that is greater than the amount of thermoplastic polymer originally present in the ePTFE composite membrane. The ePTFE composite membrane may have a dimensional change of less than 1.5% as measured by dynamic mechanical analysis (DMA) upon heating from 25° C. to 200° C. at a rate of 5° C./min and upon holding at 200° C. for 5 minutes. The fibrils may include at least about 85 wt % or about 90 wt % of ePTFE composite membrane. The nodes may include at least about 51 wt % of the thermoplastic polymer. The thermoplastic polymer may include poly(ethene-co-tetrafluoroethene) (ETFE), polyvinylidene difluoride (PVDF), polychlorotrifluoroethylene (PCTFE), fluorinated ethylene propylene (FEP), perfluoroalkoxy (PFA), and combinations thereof.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the figures should not be construed as limiting. It is to be appreciated that the terms "fibrillatable PTFE particles" and "fibrillatable PTFE" may be used interchangeably herein. In addition, the terms "thermoplastic polymer particles" and "thermoplastic polymer" may be used interchangeably herein. Also, it is to be appreciated that the expanded composite membranes are porous.

Figure 1:
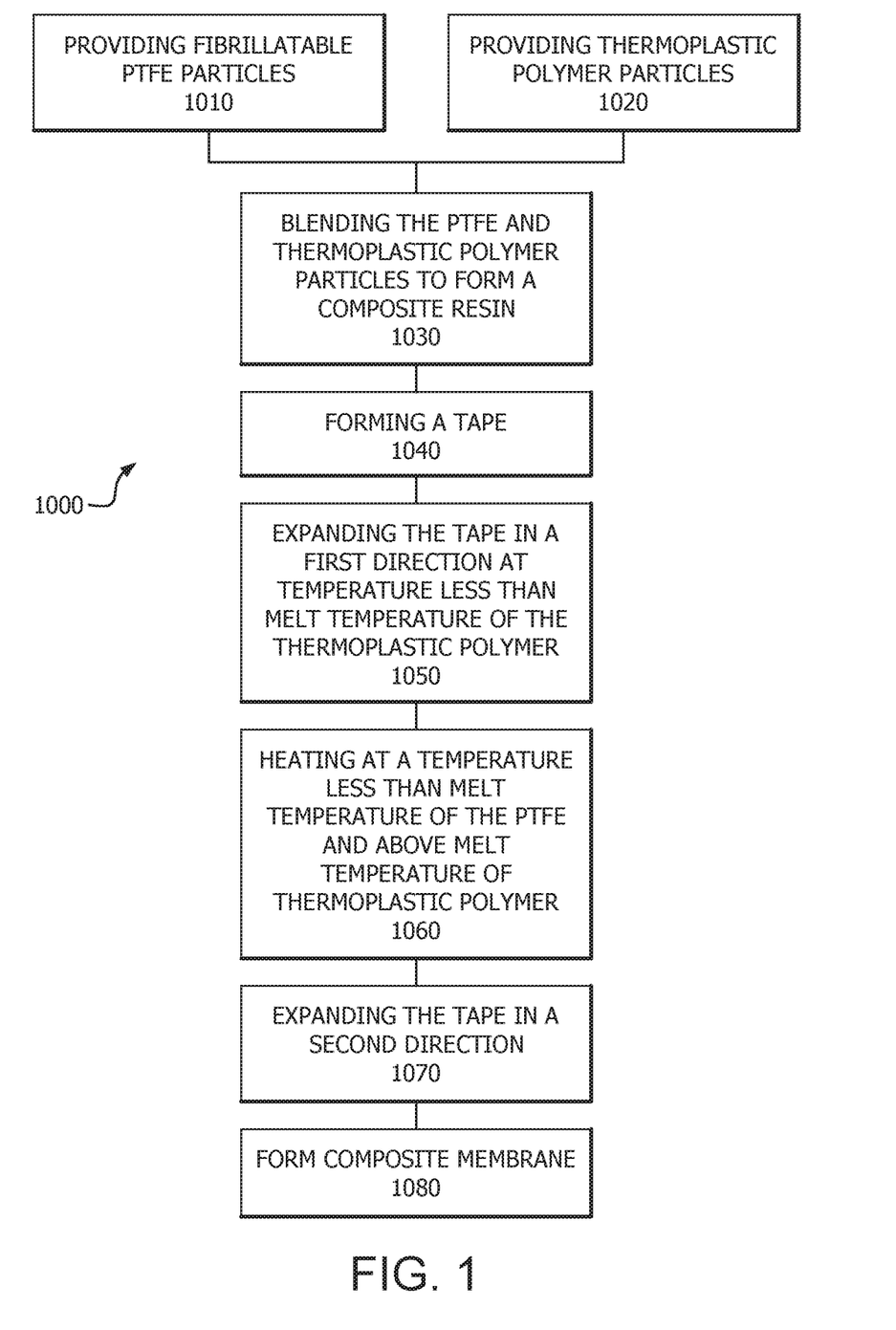
FIG. 1 is a flow chart illustrating a method of forming a biaxially expanded polytetrafluoroethylene (ePTFE) composite membrane in accordance with at least one embodiment.

Referring initially to FIG. 1, a method 1000 is shown for making an ePTFE composite membrane from PTFE particles and thermoplastic polymer particles, each of which has a different melting point. The resulting ePTFE composite membrane has structural features of both the PTFE and of the thermoplastic polymer. The resulting ePTFE composite membrane exhibits good dimensional stability and mechanical properties. It is to be appreciated that the term "thermoplastic polymer" is meant to include a single thermoplastic polymer or more than one thermoplastic polymer.

As shown in step 1010 of method 1000 of FIG. 1 thermoplastic polymer particles are provided. Fibrillatable PTFE particles useful in forming the ePTFE composite membranes according to the present disclosure are disclosed, for example, U.S. Pat. No. 3,953,566 to Gore (e.g., a homopolymer) and U.S. Pat. No. 6,541,589 to Bailie (e.g., a modified polymer). The polymer may be modified, for example, with perfluorobutylethylene (PFBE), poly(methyl vinyl ether) (PMVE), perfluoro(propyl vinyl ether) (PPVE), etc. The PTFE particles may have an average particle size of less than 1.0 µm. The PTFE particle size may be about 0.1 µm, about 0.2 µm, about 0.3 µm, about 0.4 µm, about 0.5 µm, about 0.6 µm, about 0.7 µm, about 0.8 µm, about 0.9 µm, or about 1.0 µm. In some embodiments, the PTFE particle size is from about 0.1 µm to about 1.0 µm, from about 0.2 µm to about 0.9 µm, or from about 0.3 µm to about 0.8 µm.

As shown in step 1020 of method 1000 of FIG. 1, thermoplastic polymer particles are provided. Suitable thermoplastic polymer particles include, but are not limited to, poly(ethene-co-tetrafluoroethene) (ETFE), polyvinylidene difluoride (PVDF), polychlorotrifluoroethylene (PCTFE), fluorinated ethylene polyethylene (FEP), perfluoroalkoxy (PFA), and combinations thereof. The thermoplastic polymer particle size may be approximately the same size as the fibrillatable PTFE particles, or the thermoplastic polymer particle size may be smaller than the PTFE particles. The thermoplastic polymer particle size may be about 0.1 µm, about 0.2 µm, about 0.3 µm, about 0.4 µm, about 0.5 µm, about 0.6 µm, about 0.7 µm, about 0.8 µm, about 0.9 µm, or about 1.0 µm. In some embodiments, the thermoplastic polymer particle size is from about 0.1 µm to about 1.0 µm, from about 0.2 µm to about 0.9 µm, or from about 0.3 µm to about 0.8 µm.

As shown in step 1030 of method 1000 of FIG. 1, a composite resin is formed from the PTFE particles from step 1010 and the thermoplastic polymer particles from step 1020. The composite resin formation step 1030 involves blending fibrillatable PTFE particles from step 1010 with the thermoplastic polymer particles from step 1020. In one embodiment, the PTFE particles may be polymerized in a suitable liquid (e.g., water) to form a first dispersion containing the PTFE particles. Discreet thermoplastic polymer particles may be polymerized in a suitable liquid (e.g., water) to form a second dispersion containing the thermoplastic polymer particles. Depending upon the solid content of the dispersed particles in each dispersion, the two dispersions may be blended in a desired ratio (e.g., thermoplastic polymer particle dispersion to fibrillatable PTFE particle dispersion) to produce a desired weight percent of each polymer in the blend. The blend may include about 40 wt %, about 50 wt % about 55 wt % about 60 wt %, about 65 wt %, about 70 wt %, about 75 wt %, about 77 wt %, or 79.9 wt % PTFE. In some embodiments, the PTFE content of the blend may be from about 40 wt % to 79.9 wt %, from about 50 wt % to about 70 wt %, or from about 55 wt % to about 65 wt %. In certain embodiments, the PTFE content of the blend may be as high as 75 wt %, 76 wt %, 77 wt %, 78 wt %, 79 wt %, 79.5 wt %, or 79.9 wt %. In addition, the blend may include 20.1 wt %, about 23 wt %, about 25 wt %, about 30 wt %, about 35 wt %, about 45 wt %, about 50 wt %, about 55 wt %, or about 60 wt % thermoplastic polymer. In some embodiments, the thermoplastic polymer content of the blend may be from about 23 wt % to about 60 wt %, from about 30 wt % to about 50 wt %, or from about 35 wt % to about 45 wt %, In certain embodiments, the thermoplastic polymer content of the blend may be as low as 20.1 wt %, 20.5 wt %, 21 wt %, 22 wt %, 23 wt %, or 24 wt %. In exemplary embodiments, the blend includes from 40 wt % to 79.9 wt % ePTFE and from 20.1 wt % to 60 wt % thermoplastic polymer.

The resin formation step 1030 may involve blending other ingredients and/or other steps to produce a blended dispersion having the desired weight fraction and other desired properties. For example, the resin formation step 1030 may involve coagulating the blended dispersion, such as by adding HNO₃, which is then stirred. The resin formation step 1030 may also or alternatively involve drying the blended dispersion in a vacuum oven or by other suitable drying methods as known in the art to produce a composite resin. In addition, the resin formation step 1030 may involve diluting the blended dispersion to a desired percentage of solids. The percentage of solids may be about 10 wt %, about 15 wt %, about 20 wt %, about 25 wt %, about 30 wt %, about 35 wt %, about 40 wt %, about 45 wt % or about 50 wt %. In some embodiments, the percentage of solids is from about 10 wt % to about 50 wt %, from about 15 wt % to about 45 wt %, or from about 20 wt % to about 40 wt %. In some embodiments, the percentage of solids is about 15 wt %.

As shown in step 1040 of method 1000 of FIG. 1, the composite resin is then formed into a tape. The forming step 1040 begins with cooling the composite resin prepared in the composite resin formation step 1030 to about 10° C. prior to mixing the composite resin with a suitable lubricant, such as a light mineral oil to form a lubricated mixture. Other suitable lubricants include aliphatic hydrocarbons, aromatic hydrocarbons, halogenated hydrocarbons, and the like, that are selected according to flammability, evaporation rate, and economical considerations. It is to be appreciated that the term "lubricant", as used herein, is meant to describe a processing aid consisting of an incompressible fluid that is not a solvent for the polymer at the process conditions. One particular example of a suitable lubricant is an isoparaffinic hydrocarbon, such as ISOPAR™ K SOLVENT (commercially available from Imperial Oil Chemical, Calgary, Canada).

Next, the lubricated mixture may be compressed to create a pellet, which may be extruded through an extruder die to produce a wet tape. Non-limiting examples of methods of applying pressure (compression) include ram extrusion (e.g., typically called paste extrusion or paste processing when lubricant is present). The resultant wet tape may then be calendared before drying the calendared tape to remove the lubricant. Other known methods, such as tube extrusion followed by slitting the tube to a desired thickness, may be used to form the tape. The thickness of the calendared tape may be about 0.10 mm, about 0.20 mm, about 0.30 mm, about 0.40 mm, about 0.50 mm, about 0.60 mm, about 0.70 mm, about 0.80 mm, about 0.90 mm, or about 1.0 mm. In some embodiments, the thickness of the calendared tape may be from about 0.10 mm to about 1.0 mm, from about 0.20 mm to about 0.60 mm, or from about 0.30 mm to about 0.40 mm. The drying temperature is below the melting temperature of the thermoplastic polymer. The drying temperature may be about 145° C., about 150° C., about 155° C., about 160° C., about 165° C., about 170° C., or about 175° C. In some embodiments, the drying temperature is from about 145° C. to about 175° C., from about 150° C. to about 170° C., or from about 155° C. to about 165° C. In some embodiments, the drying temperature is about 160° C.

As shown in step 1050 of method 1000 of FIG. 1, the tape is then expanded in a first direction. The expanding step 1050 may be performed in a temperature-controlled environment, such as in two ovens in series or in a single temperature-adjustable oven. To expand the tape in the first direction, the tape may be restrained, such as in a biaxial tenter frame. The restrained tape may then be heated to a first temperature, where the first temperature is less than the melting point of the thermoplastic polymer. Suitable temperatures are thermoplastic polymer specific, and are generally lower than the melt temperature of both the PTFE and the selected thermoplastic polymer. For PVDF, which has a melting temperature of 170° C., suitable temperatures include temperatures less than about 170° C. In this instance, the first temperature may be about 150° C., about 155° C., about 160° C., about 165° C., or about 170° C. In some embodiments including PVDF, the first temperature may be from about 150° C. to about 170° C. or from about 155° C. to about 165° C. For PCTFE which has a melting temperature of 200° C., suitable temperatures include temperatures less than about 200° C. In such an embodiment, the first temperature may be about 180° C., about 185° C., about 190° C., about 195° C., or about 200° C. In some embodiments, the first temperature may be from about 180° C. to about 200° C. or from about 185° C. to about 195° C. For FEP, which has a melting temperature of 280° C., suitable temperatures include temperatures less than about 280° C. In this embodiment, the first temperature may be about 260° C., about 265° C., about 270° C., about 275° C., or about 280° C. In some embodiments, the first temperature may be from about 260° C. to about 280° C. or from about 265° C. to about 275° C. For PFA, which has a melting temperature of 310° C., suitable temperatures include temperatures less than about 310° C. In this instance, the first temperature may be about 290° C., about 295° C., about 300° C., about 305° C., or about 310° C. In some embodiments, the first temperature is from about 290° C. to about 310° C. or from about 295° C. to about 305° C. For ETFE, which has a melting temperature of 260° C., suitable temperatures include temperatures less than about 260° C. In such embodiments, the first temperature may be about 240° C., about 245° C., about 250° C., about 255° C., or about 260° C. In some embodiments, the first temperature is from about 240° C. to about 260° C., from about 245° C. to about 255° C., or from about 249° C. to about 251° C. In other embodiments, the suitable first temperature may be less than about 290° C. for ETFE, less than about 170° C. for PVDF, less than about 200° C. for PCTFE, less than about 280° C. for FEP, or less than about 310° C. for PFA. In some embodiments, the restrained tape is heated to a first temperature of about 250° C.

As shown in steps 1060 and 1070 of method 1000 of FIG. 1, the uniaxially expanded porous membrane from step 1050 is further expanded in a second direction (i.e. orthogonal to first direction) after heating in step 1060 (or concurrently with the heating step 1060) at a temperature that is less than the melt temperature of the PTFE but above the melt temperature of the thermoplastic polymer. In some embodiments, the second expansion in step 1070 is in a second direction that is different from the first direction. In further embodiments, the second direction is orthogonal to the first direction. In exemplary embodiments, the composite membrane is heated to a temperature that is less than the melt temperature of the PTFE and above the melt temperature of the thermoplastic polymer and is then expanded in the second direction. The heating step 1060 may be performed in a second oven different from the first oven of step 1050 or the heating may occur in the oven utilized in step 1050.

The second temperature is greater than the first temperature of step 1050 (i.e., the temperatures is above the melt temperature of the thermoplastic) but is less than the melting point of the PTFE (i.e., less than about 340° C.). The second temperature may be about 280° C., about 285° C., about 290° C., about 295° C., about 300° C., about 305° C., about 310° C., or about 315° C. In some embodiments, the second temperature is from about 280° C. to about 300° C., from about 290° C. to about 310° C., or from about 295° C. to about 305° C. In exemplary embodiments, the second temperature is about 300° C. The heating step 1060 may be performed for about 30 seconds, about 60 seconds, about 90 seconds, or about 120 seconds. In certain embodiments, the heating step 1060 may be performed from about 60 to about 90 seconds.

The first and second directions of stretching may correspond to (i) the machine direction (MD), also referred to as longitudinal direction or extrusion direction, or (ii) the transverse direction (TD), also referred to as cross direction, where the TD is orthogonal to the MD. In some embodiments, the first direction is oriented longitudinally and the second direction is transverse to the first stretch orientation. In other embodiments, the first direction is oriented transversely and the second direction is longitudinal with respect to the first stretch orientation. To accommodate some standard equipment, it may be advantageous to stretch the tape in the machine direction before stretching in the transverse direction. Conversely, it is also contemplated to stretch the tape in the transverse direction before stretching in the machine direction.

Method 1000 of FIG. 1 also involves maintaining the tape at a temperature less than 327° C. for all steps. Fibrillatable PTFE particles from step 1010 have an initial melting point of about 340° C. and a second melting point after sintering of 327° C. about 340° C. Thus, method 1000 of FIG. 1 does not involve heating the tape to a temperature at or above 340° C. in any step. In some embodiments, the method 1000 is devoid of a heating the tape at or above 327° C., or its sintering temperature. In some embodiments, the method 1000 may be formed of heating steps 1050 and 1070 without any additional heating. By maintaining the tape below the initial melting point of PTFE, the resulting ePTFE composite membrane 100 (FIG. 5) is unsintered.

The method 1000 shown in FIG. 1 is provided as an example of the various features of the method 1000 and, although the combination of those illustrated features is clearly within the scope of invention, the steps shown in method 1000 are not meant to suggest the inventive concepts provided herein are limited from including fewer steps, additional steps, or alternative steps to one or more of the steps shown in FIG. 1. For example, in various embodiments, the expanding steps 1050, 1070, and the heating steps 1050, 1060 may be performed concurrently and/or in different orders.

Figure 5:
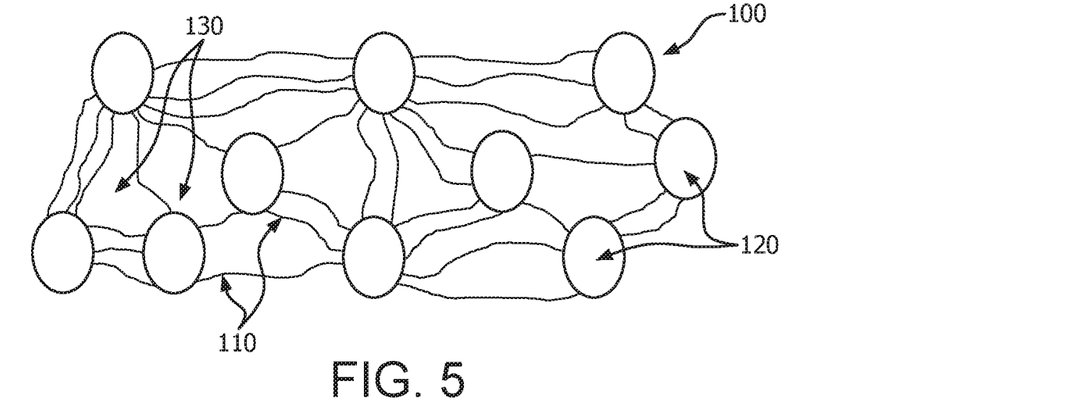
FIG. 5 is a schematic illustration of the structure of an ePTFE composite membrane having fibrils formed primarily of ePTFE and nodes enriched with a thermoplastic polymer in accordance with at least one embodiment.
Figure 7:
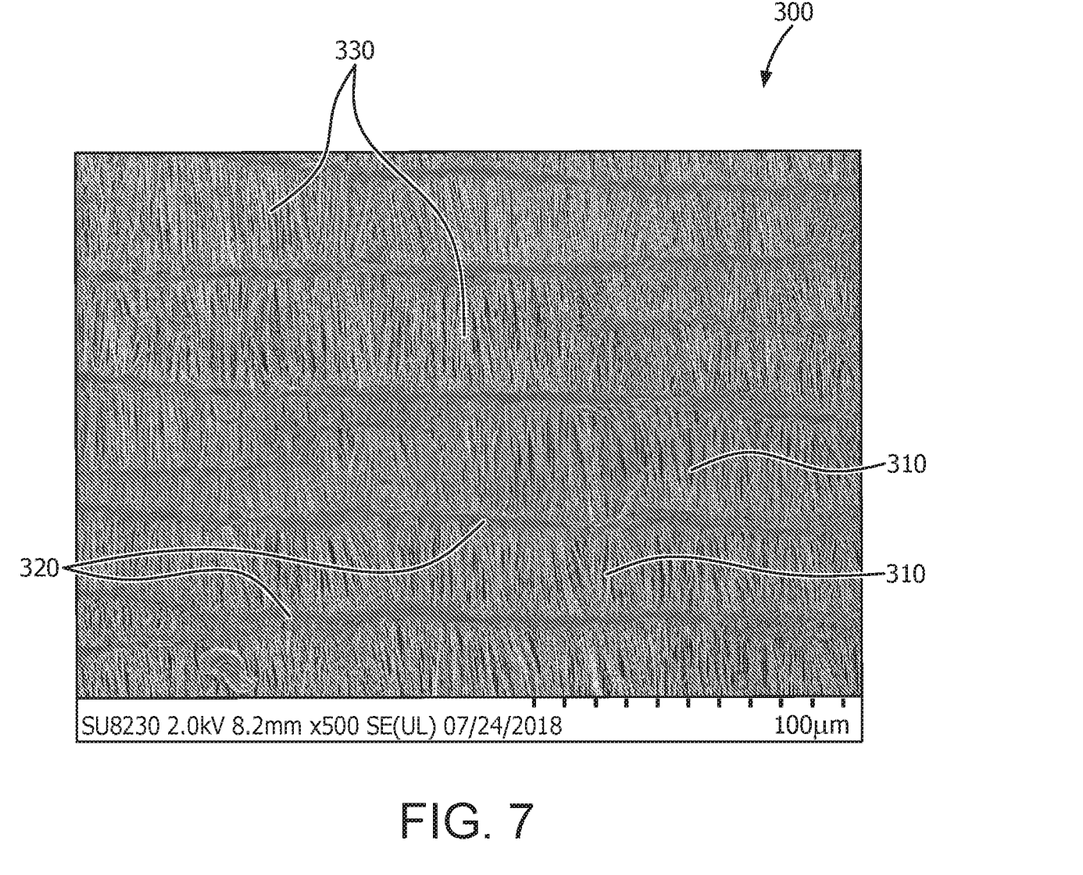

A biaxially stretched, ePTFE composite membrane 100 made in accordance with the method 1000 of FIG. 1 is schematically shown in FIG. 5. Notably, the ePTFE composite membrane 100 includes a microstructure containing fibrils 110, nodes 120, and pores 130. The nodes 120 are masses of polymeric material and ePTFE, and the fibrils 110 are formed of ePTFE and extend between and interconnect the nodes 120. The microstructure of the ePTFE composite membrane may be altered, for example, by varying the viscosity of the thermoplastic polymer, in which case the microstructure would include roughly parallel nodes (as shown in FIG. 7).

The fibrils 110 are formed primarily of ePTFE, meaning that ePTFE makes up a majority (i.e., more than 50%) of the weight of the fibril 110. As such, the weight ratio of ePTFE to thermoplastic polymer in the fibrils 110 is greater than 1:1. In some embodiments, fibrils 110 may be formed of 51 wt % ePTFE, about 55 wt % ePTFE, about 60 wt % ePTFE, about 65 wt % ePTFE, about 70 wt % ePTFE, about 75 wt % ePTFE, about 80 wt % ePTFE, about 85 wt % ePTFE, about 90 wt % ePTFE, or about 95 wt % ePTFE. In some embodiments, fibrils 110 may be formed of at least about 90 wt % ePTFE, or at least about 95 wt % ePTFE, or even greater. In some embodiments, the fibrils 110 are substantially formed or entirely formed of ePTFE. As used herein, the term "substantially formed" is meant to denote that the fibril is formed entirely of (e.g., 100%), or nearly entirely formed of ePTFE (e.g., 99%, 98%, 97%, 96%). With respect to method 1000, a majority of the PTFE from the providing step 1010 may be present in the fibrils 110.

The nodes 120 may be enriched by thermoplastic polymer meaning that thermoplastic polymer content is higher in the nodes 120 than the thermoplastic polymer content of the ePTFE composite membrane 100 as a whole. In some embodiments, the nodes 120 may have a thermoplastic polymer content that is greater than the thermoplastic polymer content provided in the composite resin (see Step 1030 in FIG. 1). In other words, the thermoplastic polymer content of the nodes 120 is greater than about 20 wt % when ePTFE composite membrane is formed having a thermoplastic polymer content of about 20 wt %; the thermoplastic polymer content of the nodes is greater than about 30 wt % when membrane is formed having a thermoplastic polymer content of about 30 wt %; etc.

In certain embodiments, the nodes 120 may be formed primarily of thermoplastic polymer, meaning that the thermoplastic polymer makes up a majority (i.e., more than 50%) of the weight of the node 120. As such, the weight ratio of thermoplastic polymer to ePTFE in the nodes 120 is greater than 1:1. In some embodiments, the nodes 120 may be formed of 51 wt % thermoplastic polymer, about 55 wt % thermoplastic polymer, about 60 wt % thermoplastic polymer, about 65 wt % thermoplastic polymer, about 70 wt % thermoplastic polymer, about 75 wt % thermoplastic polymer, or about 80 wt % thermoplastic polymer.

The porosity of the ePTFE composite membrane 100 may vary as a function of the distance between the nodes 120 (e.g., the size of the pores). As the internodal distance decreases, porosity decreases, and vice versa. The porosity of membrane 100 may also vary as a function of the size of each node 120. As the size of each node 120 increases, the porosity decreases, and vice versa. The porosity of the ePTFE composite membrane may be about 10%, about 20%, about 30%, about 40%, about 50%, about 60%, about 70%, about 80%, about 90%, about 95%, about 96%, about 97%, about 98%, or about 99%. In some embodiments, the porosity is from about 10% to about 99%, from about 40% to about 90%, or from about 50% to about 80%.

The thickness of the ePTFE composite membrane 100 may also vary. The thickness of the ePTFE composite membrane 100 may be about 10 μm, about 15 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, or about 150 μm. In some embodiments, the thickness of the ePTFE composite membrane 100 is about from 10 μm to about 150 μm, from about 15 μm to about 120 μm, or from about 20 μm to about 100 μm.

Figure 6:
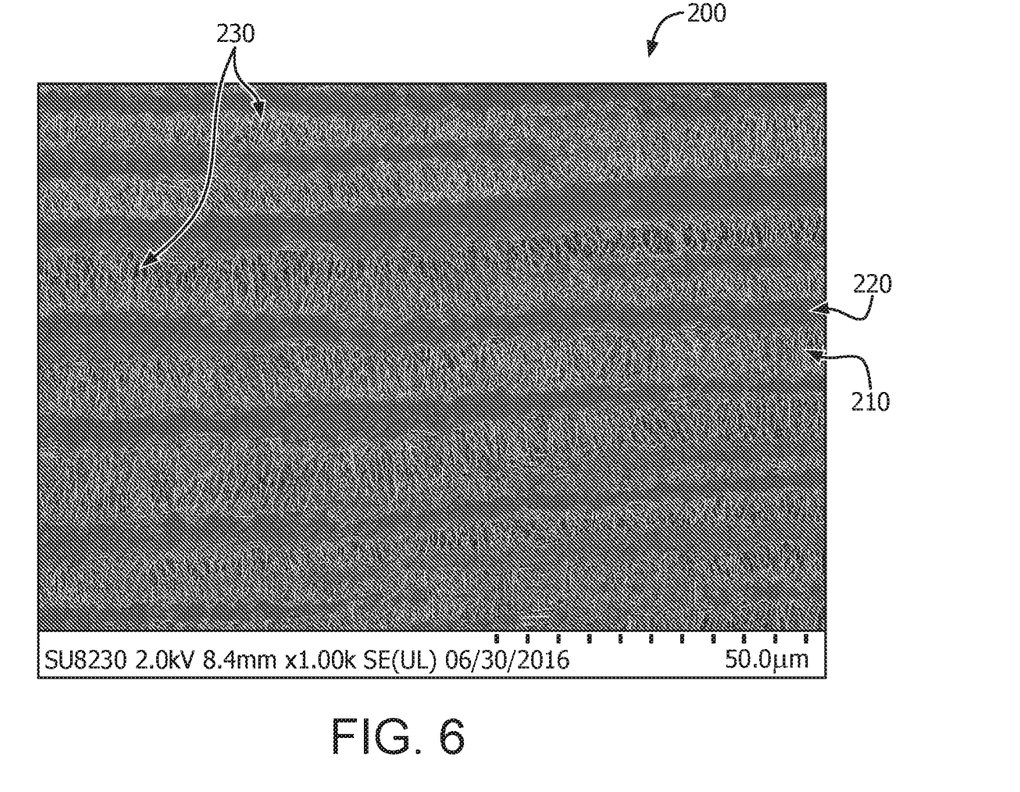
FIG. 6 is a scanning electron micrograph (SEM) showing the structure of an ETFE/ePTFE composite membrane in accordance with at least one embodiment; and, FIG. 7 is a scanning electron micrograph (SEM) showing the structure of an ETFE/ePTFE composite membrane in accordance with another embodiment.

A scanning electron micrograph of an ePTFE/thermoplastic polymeric composite membrane 200 made in accordance with the method 1000 of FIG. 1 is shown in FIG. 6. Like membrane 100 of FIG. 5, membrane 200 of FIG. 6 has fibrils 210, nodes 220, and pores 230. As discussed above, the ePTFE/thermoplastic polymeric composite membrane may be configured to have thinner and substantially parallel nodes, such as shown in FIG. 7, which depicts the membrane 300, fibrils 310, nodes 320, and pores 330.

Membranes 100, 200, 300 are dimensionally stable, exhibit high matrix modulus, and have a relatively high ratio of geometric mean matrix modulus to geometric mean matrix tensile strength. The absolute dimensional change percentage was measured by a dynamic mechanical analysis (DMA) that is described in detail below under "Dimensional Stability Tests". In particular, the sample was heated from 25° C. to 200° C. at 5° C./min and then held at 200° C. for 5 minutes. The absolute dimensional change percentage for the ePTFE composite membranes may be about 0.1%, about 0.2%, about 0.3%, about 0.4%, about 0.5%, about 0.6%, about 0.7%, about 0.8%, about 0.9%, about 1.0%, about 1.25%, or about 1.5%. In some embodiments, the absolute dimensional change percentage is from about 0.1% to about 1.5%, from about 0.2% to about 1.0%, or from about 0.3% to about 0.9%. In some embodiments, the absolute dimensional change percentage is less than 1.5%. The matrix modulus of the ePTFE composite membranes may be about 700 MPa, about 800 MPa, about 900 MPa, about 1000 MPa, about 1100 MPa, about 1200 MPa, about 1300 MPa, about 1400 MPa, about 1500 MPa, or about 1600 MPa. In some embodiments, the matrix modulus is from about 700 MPa to about 1600 MPa, from about 800 MPa to about 1500 MPa, or from about 900 MPa to about 1400 MPa. The ratio of geometric mean matrix modulus to geometric mean matrix tensile strength of the ePTFE composite membranes may about 6, about 8, about 10, about 12, about 14, or about 16. In some embodiments, the geometric mean matrix modulus is from about 6 to about 16, from about 8 to about 14, or from about 10 to about 12.

Test Methods

It should be understood that although certain methods and equipment are described below, other methods or equipment determined suitable by one of ordinary skill in the art may be alternatively utilized.

Non-Contact Thickness Measurements

The non-contact thickness of the membranes was measured using a KEYENCE LS-7600 laser system (commercially available from KEYENCE America).

Membrane Density Calculation

Samples were die cut to form rectangular sections 9.05 cm by 5.08 cm. Each sample was weighed using an A&D Model HF 400 balance. Using the thickness calculated by the KEYENCE laser, the density of the samples were calculated using the following formula:

$$\rho = \frac{m}{w * l * t}$$

where: ρ=density (g/cc)
m=mass (g)
w=width (9.05 cm)
l=length (5.08 cm)
t=thickness (cm).

Matrix Tensile Strength (MTS)

To determine MTS, a sample ePTFE composite membrane was cut in the longitudinal and transverse directions using an ASTM D412-Dogbone Die Type F (DD412F). Tensile break load was measured using an INSTRON® 5500R (Illinois Tool Works Inc., Norwood, MA) tensile test machine equipped with flat-faced grips and a "200 lb" (~90.72 kg) load cell. The guage length for the grips was set to 8.26 cm and a strain rate of 0.847 cm/s or 14.3%/s was used. After placing the sample in the grips, the sample was retracted 1.27 cm to obtain a baseline followed by a tensile test at the aforementioned strain rate. Two samples for each condition were tested individually and the average of the maximum load (i.e., the peak force) measurements was used for the MTS calculation. The longitudinal and transverse MTS were calculated using the following equation:

MTS=(maximum load/cross-sectional area)*(density of resin/density of the membrane).

The geometric mean of the MTS for each membrane was then calculated using the following equation:

Geometric mean MTS=Square Root[(longitudinal MTS)*(transverse MTS)].

Matrix Tensile Stress at a Specified Strain

Matrix Tensile Stress=(Load at specific strain/cross-sectional area)*(density of resin/density of the membrane)

Matrix Modulus

From the same tensile test as described in the Matrix Tensile Strength at a Specified Strain, the raw data was imported into a data analysis program. Due to difficulties loading the samples into the grips perfectly, the 0 strain point for each sample was calculated as the point at which the standard deviation of the load is two deviations above zero. The modulus was taken from the 0 cm point to an additional 0.18 cm (or 0-3% strain based upon the gage length of the D412-F Dogbone). The modulus is the slope of stress/strain. The matrix modulus for both the longitudinal and transverse directions was calculated using the following equations:

Matrix tensile stress at 3% strain=(load at 3% strain/cross-sectional area)*(density of resin/density of the membrane)

Matrix modulus=(Matrix tensile stress at 3%)/(0.03).

The geometric mean of the matrix modulus for each membrane was then calculated using the following equation:

Geometric Mean Matrix Modulus=Square Root[(longitudinal Matrix Modulus)*(transverse Matrix Modulus)].

The ratio of matrix modulus to matrix tensile strength was then calculated using the following equation:

Ratio of Matrix Modulus to Matrix Tensile Strength=Geometric Mean Matrix Modulus/Geometric Mean Matrix Tensile Strength.

Differential Scanning Calorimetry (DSC) Measurement

Figure 2:
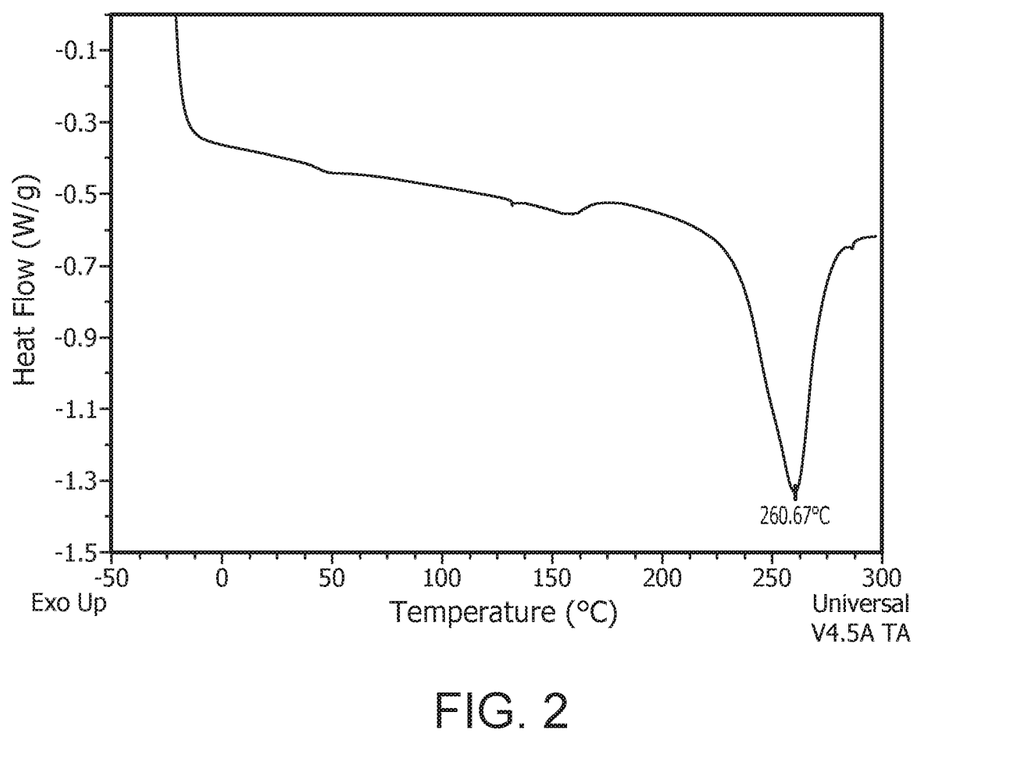
FIG. 2 is a differential scanning calorimetry (DSC) graph of the poly(ethene-co-tetrafluoroethene) (ETFE) resin of Example 1 which has a melting point of about 260° C. in accordance with at least one embodiment.
Figure 3:
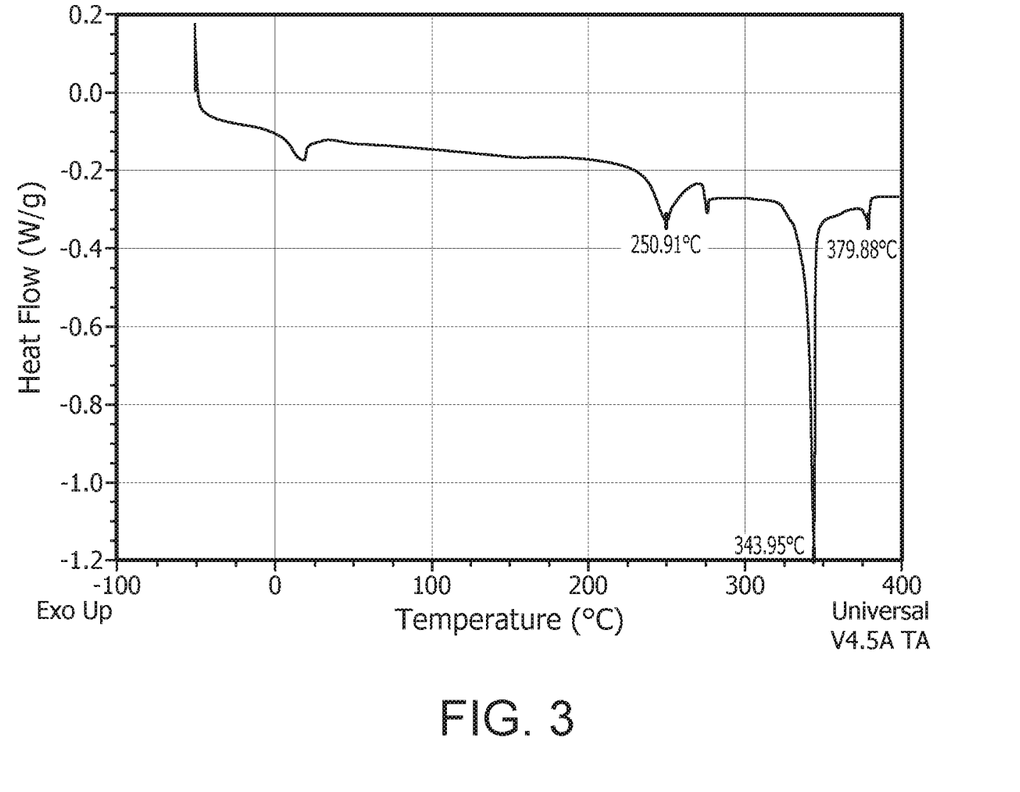
FIG. 3 is a DSC graph of the PTFE/ETFE composite membrane of Example 7 which has a melting point of about 344° C., indicating that the PTFE composite membrane was not previously sintered in accordance with at least one embodiment.
Figure 4:
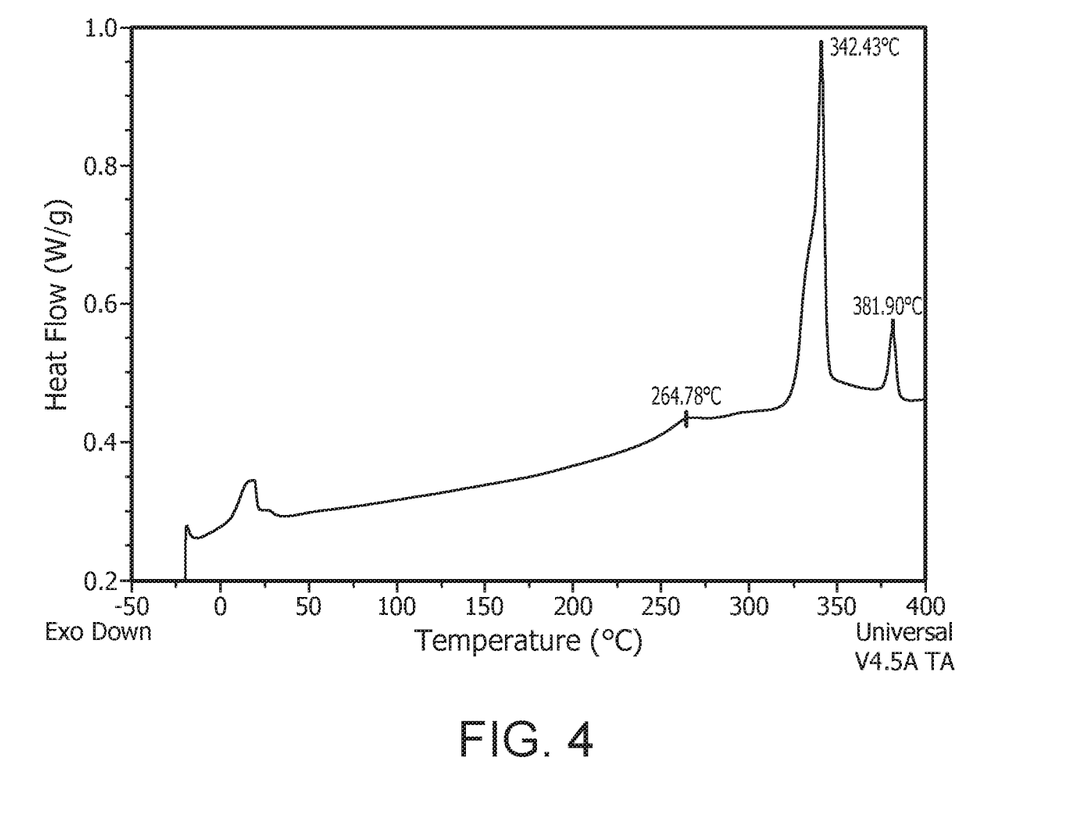
FIG. 4 is a DSC graph of the FEP/PTFE composite membrane of Example 9, which has a melting point of about 342° C. in accordance with at least one embodiment.

DSC measurements were performed on a Q2000 machine (TA Instruments, New Castle, Delaware). DSC was used to identify the melting point of the ETFE of Example 1 as shown in FIG. 2 and the ePTFE composite membranes produced according to Examples 7 and 9, as shown in FIGS. 3 and 4, respectively. For ePTFE composite membrane samples, the sample has not been previously sintered if the resulting membrane has a melting point as measured by DSC of about 344° C., which provides the indicator that the PTFE underwent initial melting during DSC and thus was not previously sintered during expansion.

Dimensional Stability Tests

Dynamic mechanical analysis (DMA) was conducted using an RSA-G2 Solids Analyzer available from TA Instruments (New Castle, Delaware). ePTFE composite membrane samples were cut out in the machine direction with a width of 13 mm and a gauge length of 15 mm. With a minimal load of 1 g to keep the sample taut, the sample was heated from 25° C. to 200° C. at 5° C./min and then held at 200° C. for 5 minutes. The dimensional change for each sample was measured over the time period and the final absolute change in dimension was reported (See Table 2).

EXAMPLES

Example 1

Ethylene-tetrafluoroethylene (ETFE) polymerization was performed as follows. 23 kg of deionized (DI) water, 5 g of oxalic acid, 20 mL of chloroform, and 0.6 kg of a non-telogenic perfluorinated dispersing agent were added to a 50-liter horizontal polymerization reactor equipped with a 3-bladed agitator. The reactor was repeatedly evacuated and pressurized to about 1 Atmosphere (Atm) (approximately 101.325 kPa) or less with tetrafluoroethylene (TFE) until the oxygen level was reduced to 20 ppm or less. The contents were briefly agitated at about 60 rpm between evacuation and purge cycles to ensure that the water was deoxygenated. The reactor was cooled to 20° C. and agitated at 60 rpm. Subsequently, 1550 kPa of TFE was added followed by addition of 550 kPa of ethylene. At this time, $KMnO_4$ in a DI water solution (0.6 g/L) was continually injected at 40 g/min. After every 200 kPa drop in pressure, 110 kPa of TFE and 90 kPa of ethylene were added back into the reactor to maintain a steady pressure. After 322 minutes, the reaction was stopped and the pressure vented. 44.64 kg of dispersion was produced with a solid content of 15.96 wt % solids and a raw dispersion particle size of 220 nm. As shown in FIG. 2, the resulting ETFE resin had a melting point of 260° C. as measured by DSC.

Example 2

Polytetrafluoroethylene (PTFE) polymerization was performed as follows. 1.5 kg paraffin wax, 28 kg of de-ionized (DI) water, 18 g of a non-telogenic perfluorinated dispersing agent, and 5 g of succinic acid dissolved in about 50 grams of DI water were added to a 50-liter horizontal polymerization reactor equipped with a 3-bladed agitator. The reactor and contents were heated above the melting point of the wax of about 60° C. The reactor was repeatedly evacuated and pressurized to about 1 atmosphere (~101.325 kPa) or less with TFE until the oxygen level was reduced to 20 ppm or less. The contents were briefly agitated at about 60 rpm between evacuation and purge cycles to ensure that the water was deoxygenated. 8 mL of perfluorobutylethylene (PFBE) was added to the evacuated reaction as a precharge of comonomer. The reactor was then heated to 83° C.

TFE was then added to the reactor until the pressure reached 2.8 MPa (approximately 3.0 kg) and $KMnO_4$ in DI water solution (0.063 g/L) was injected at 80 mL/min until about 2.0 kg of TFE had been added. This was accomplished in about 7 minutes. About 100 g of a non-telogenic perfluorinated dispersing agent was added in 12 gram increments, the first increment being added after about 1 kg of TFE had been added to the reactor, and the subsequent increments added after each subsequent kg of TFE had been added, so that the final increment was added after about 9 kg of TFE had been charged. The $KMnO_4$ addition rate was decreased to 40 mL/min at the 2 kg TFE level and continued at this rate until about 3 kg TFE had been added. The $KMnO_4$ addition rate was then further decreased to 20 mL/min until about 5 kg of TFE had been added. The $KMnO_4$ addition was then decreased to 10 mL/min and addition was continued at this rate until about 7 kg of TFE had been added to the reactor, at which time the addition of $KMnO_4$ was stopped. The resulting dispersion had a raw dispersion particle size of 203 nm and a solid content of 35.0 wt % solids.

Example 3

Vinylidene difluoride (VDF) modified polychlorotrifluoroethylene (mPCTFE) polymerization was performed as follows. 28 kg of DI water, 5 g of oxalic acid, 100 g ammonium bisulfite monohydrate, and 0.5 kg of a non-telogenic perfluorinated dispersing agent were added to a 50-liter horizontal polymerization reactor equipped with a 3-bladed agitator. The reactor was repeatedly evacuated and pressurized to about 1 atmosphere (~101.325 kPa) or less with vinylidene fluoride (VDF) until the oxygen level was reduced to 20 ppm or less. The contents were briefly agitated at about 60 rpm between evacuation and purge cycles to ensure that the water was deoxygenated. The reactor was then cooled to 60° C. and agitated at 60 rpm. Next, 100 kPa of VDF was added to the reactor followed by addition of 2.0 L of liquefied chlorotrifluoroethylene (CTFE) through a high pressure liquid pump to a final pressure of 1400 kPa in the reactor. An ammonium persulfate solution (5 g dissolved in 100 mL DI water) was continually added at a rate of 5 g/min to the reactor. CTFE was continually added into the reactor to maintain a pressure of 1400 kPa. After every 100-mL addition of liquefied CTFE, 10 kPa of VDF was added to the reactor. The reaction was stopped after 300 minutes (a total of 3.6 L of CTFE monomer and 360 kPa of VDF added) and pressure within the reaction vessel was vented. A total of 37.74 kg of dispersion was produced having a solids content of 15.2 wt %. DSC analysis showed a melting point of 203° C. A skeletal density of 2.177 g/mL was determined using helium pycnometry. The dispersion of mPCTFE was then co-coagulated with the dispersion of PTFE produced in Example 2 using the general blending methodology described in Example 4 to give a final composite resin that is 40 wt % PCTFE and 60 wt % PTFE.

Example 4

Blending ETFE and PTFE was performed as follows. Based upon the solid contents of the two resins from the polymerizations described as in Examples 1 and 2, respectively, the two dispersions were mixed in a ratio of 1 kg of 15.96 wt % solids ETFE dispersion to 0.684 kg of 35.0 wt % solids PTFE. This produced a dispersion with 23.7 wt % solids, comprised of 40 wt % ETFE and 60 wt % PTFE. This dispersion was then diluted to 15 wt % solids. To coagulate the two materials, 1.0 L of 65 wt % $HNO_3$ was added to the 117 kg dispersion being stirred at 100 rpm. The stirring rate was increased to 420 rpm and stirred for an additional 12 minutes to produce an air-wet composite resin. This composite resin was then dried in a vacuum oven at 150° C. for 28 hours to produce 17.7 kg of final resin that contains 40 wt % ETFE thermoplastic and 60 wt % fibrillatable PTFE.

Example 5

Fluorinated ethylene propylene (FEP) polymerization was performed as follows. 23 kg of DI water and 0.2 kg of a non-telogenic perfluorinated dispersing agent were added to a 50-liter horizontal polymerization reactor equipped with a 3-bladed agitator. The reactor was repeatedly evacuated and pressurized to about 1 atm (approximately 101.325 kPa) or less with TFE until the oxygen level was reduced to 20 ppm or less. The contents were briefly agitated at about 60 rpm between evacuation and purge cycles to ensure that the water was deoxygenated. The reactor was heated to 85° C. and agitated at 60 rpm. Subsequently, 3 kg of hexafluoropropylene (HFP) was added to the reactor. TFE was then added to the reactor until the total pressure was 1100 kPa. At this time, 2.5 kg of a solution of ammonium persulfate in DI water (1.13 g/L) was added to the reactor. The pressure was maintained at 1100 kPa by continually adding TFE to the reactor as it was consumed. The reaction was stopped after 105 minutes to give 35.65 kg of dispersion having 14.6 wt % solids. This resin is suitable for blending with PTFE following the general blending process described in Example 4.

Example 6

ETFE/PTFE extrusion was performed as follows. 3.17 kg of ETFE/PTFE resin blend prepared from Example 4 was cooled to 10° C. before mixing with 0.80 kg of ISOPAR™ K, an isoparaffinic hydrocarbon lubricant, and tumbled for 10.5 minutes in a drum tumbler. This mixture was then compressed at 3.1 MPa in a 101 mm diameter tube to create a pellet. The pellet was heated at 70° C. overnight in a concealed tube to prevent ISOPAR™ K from evaporating. The pellet was then extruded through an extruder heated at 49° C. with a die of dimensions 229 mm wide by 0.46 mm thick, at a rate of 0.76 mm/s. The resulting wet tape was then calendared to 0.30 mm before drying in a dryer at a temperature of 160° C. to remove all ISOPAR™ K from the tape. The resulting dried tape had a mass per area of 420 g/m$^2$.

Example 7

ETFE/PTFE expansion was performed as follows. A section of the dried extrudate from Example 6 was then placed in a biaxial tenter frame with two ovens to produce a biaxially stretched, porous ETFE/PTFE membrane. After heating the restrained tape at 250° C. for 120 s (i.e., below the ETFE melting point), the tape was then stretched 10:1 in the longitudinal direction at a rate of 50%/s. The expanded ETFE/PTFE membrane was then heated in the second oven at 300° C. (i.e., above the melting point of the ETFE but below the melting point of the PTFE) and stretched 10:1 in the transverse direction at a rate of 50%/s. This biaxial expansion produced a porous ETFE/PTFE membrane with a mass per area of 6.2 g/m$^2$, a thickness of 18.85 micrometers, and a MTS of 185 MPa in the longitudinal direction by 92 MPa in the transverse direction. As shown in FIG. 3, the resulting membrane had a melting point as measured by DSC of about 344° C., indicating that the PTFE underwent initial melting during DSC and thus was not previously sintered during expansion. It is to be appreciated that if the PTFE had been sintered, then the 344° C. melting point would not have been indicated by the DSC and the melting point of the PTFE would have been 327° C.

Comparative Example 1

PTFE extrusion was performed as follows. The PTFE resin prepared in Example 2 was coagulated without blending with a thermoplastic. To 7.71 kg of this resin was added 1.94 kg of ISOPAR™ K and mixed for 10.25 minutes. This mixture was then compressed at 3.1 MPa in a 101 mm diameter tube to create a pellet. This pellet was extruded at about 22° C. with a die of dimensions 229 mm wide by 0.46 mm thick, at a rate of 12.2 mm/s. The wet tape was calendared to 0.30 mm before drying in a dryer to remove all ISOPAR™ K from the tape. The resulting dried tape had a mass per area of 400 g/m$^2$.

Comparative Example 2

PTFE expansion was performed as follows. A section of the tape from Comparative Example 1 was placed in a biaxial tenter frame containing two ovens to produce a biaxially stretched membrane. After heating the restrained tape at 300° C., the tape was biaxially stretched 10:1 simultaneously in both the longitudinal and transverse directions at a rate of 700%/s and then sintered restrained at 365° C. for 90 seconds. The resulting membrane had a mass per area of 6.2 g/m$^2$, a thickness of 28.9 um, and a MTS of 240 MPa in the longitudinal direction by 96 MPa in the transverse direction.

Comparative Example 3

Non-melted ETFE/PTFE blend expansion was performed as follows. A section of the tape prepared in Example 6 was placed in a biaxial tenter frame containing two ovens to produce a biaxially-stretched membrane. After heating, the restrained tape the tape was stretched 10:1 in the longitudinal direction at a rate of 250%/s at 250° C. (below the ETFE melting point) before stretching the tape 10:1 in the transverse direction at a rate of 250%/s at 250° C. This ETFE/PTFE composite membrane was never subjected to temperatures at or above the melting points of either ETFE or PTFE. The membrane had a mass per area of 6.81 g/m$^2$ and a thickness of 120 μm.

Example 8

FEP/PTFE blend extrusion was performed as follows. 13.22 kg of a blended resin was prepared following the general blending method described in Example 4. The blended FEP/PTFE resin comprised 40 wt % FEP (as synthesized in Example 5) with 60 wt % PTFE (as synthesized in Example 2) and was cooled to 10° C. before mixing with 3.33 kg of ISOPAR™ K lubricant and tumbled for 10.5 minutes in a drum tumbler. The mixture was then compressed at 3.1 MPa in a 101 mm diameter tube to create a pellet. The pellet was heated at 49° C. overnight in a concealed tube to prevent ISOPAR™ K from evaporating. The pellet was extruded through an extruder heated at 49° C. with a die of dimensions 229 mm wide by 0.46 mm thick, at a rate of 2.54 mm/s. The wet tape was then calendared to 0.25 mm before drying in a dryer at a temperature of 180° C. to remove all ISOPAR™ K from the tape.

Example 9

FEP/PTFE blend expansion was performed as follows. The dried tape from Example 8 was stretched at a ratio of 4:1 at a rate of 10 meters per minute in the longitudinal direction in an over at a temperature of 200° C. (below the FEP melting point). This expanded tape was then stretched a second time in the same longitudinal direction through the same oven at 200° C., a ratio of 2:1, and a rate of 2.5 meters per minute. Finally, the tape was sent through an oven at 300° C. (above the FEP melting point but below the PTFE melting point) to produce a uniaxially stretched tape that was uniformly melted. A section of this tape was then placed on a tenter frame and heated to 300° C. (above the FEP melting point but below the PTFE melting point) and was stretched 10:1 in the transverse direction at a rate of 100%/s. The resulting membrane included a melting point as measured by DSC of about 342° C. for the PTFE, indicating that the PTFE underwent initial melting during DSC and thus was not previously sintered during expansion (see FIG. 4).

Example 10

ETFE/PTFE blend expansion was performed as follows. A section of the dried extrudate from Example 6 was placed in a biaxial tenter frame with two ovens to produce a biaxially-stretched, porous membrane. After heating the restrained tape at 250° C. (below the ETFE melting point) the tape was stretched 10:1 in the longitudinal direction at a rate of 50%/s. The expanded membrane was then heated in the second oven at 300° C. (i.e., above the melting point of the ETFE but below the melting point of the PTFE) and stretched 5:1 in the transverse direction at a rate of 50%/s. The resulting porous ETFE/PTFE composite membrane had a mass per area 13.6 g/m², a thickness of 67.8 micrometers, and a MTS of 203 MPa in the longitudinal direction by 43 MPa in the transverse direction.

Example 11

ETFE/PTFE blend expansion was performed as follows. A section of the dried extrudate from Example 6 was placed in a biaxial tenter frame with two ovens to produce a biaxially-stretched, porous membrane. After heating the restrained tape at 250° C. (i.e., below the ETFE melting point), the tape was stretched 5:1 in the longitudinal direction at a rate of 50%/s. This expanded membrane was then heated in the second oven at 300° C. (i.e., above the melting point of the ETFE but below the melting point of the PTFE) and stretched 10:1 in the transverse direction at a rate of 50%/s. This produced a porous ETFE/PTFE composite membrane with a mass per area of 13.6 g/m², a thickness of 67.8 micrometers, and a MTS of 108 MPa in the longitudinal direction by 107 MPa in the transverse direction.

Example 12

ETFE/PTFE blend expansion was performed as follows. A piece of dried extrudate from Example 5 was placed on the biaxial tenter frame and stretched biaxially at 250° C. (i.e., below the melting point of ETFE), 10:1, and 250%/s in the longitudinal direction, followed by the transverse direction. No stretching was performed at a temperature at or above the ETFE melting point of 260° C. After the stretching operations, the membrane was heat treated at 300° C. (i.e., above the melting point of the ETFE but below the melting point of the PTFE) for 60 seconds. This produced an ETFE/PTFE composite membrane with a mass per area of 6.7 g/m², a thickness of 99 micrometers, and a MTS of 164 MPa in the longitudinal direction by 96 MPa in the transverse direction.

Comparative Example 4

PTFE expansion was performed as follows. A piece of dried extrudate from Comparative Example 1 (PTFE—no thermoplastic) was placed on the biaxial tenter frame and heated at 300° C. (i.e., below the PTFE melt), then stretched 10:1 in the longitudinal direction. The sample was then moved to the second oven and heated at 365° C. (i.e., above the PTFE melting point) and stretched 6:1 in the transverse direction. This produced an ePTFE porous membrane with a mass per area of 10.9 g/m², a thickness of 70.6 micrometers, and a MTS of 251 MPa in the longitudinal direction by 192 MPa in the transverse direction. The ePTFE membrane was observed to be dimensionally stable and did not retract upon itself when removed from the tenter frame pins.

Comparative Example 5

A resin was made by blending 15 wt % ETFE prepared according to Example 1 and 85 wt % PTFE prepared according to Example 2. The resin was paste extruded into a flat tape that was 0.76 mm thick by 76 cm wide. The tape was then calendered between two metal nips to give a tape that was 0.46 mm thick and had a MTS of 30.6 MPa in the longitudinal direction and 15.0 MPa in the transverse direction. A piece of the dried extrudate was placed on the biaxial tenter frame and stretched biaxially at 250° C. (i.e., below the melting point of the ETFE), 10:1 in both the machine direction and transverse directions. The sample was then moved to the second oven and heated at 365° C. (i.e., above the melting point of PTFE), for 60 seconds. This produced an ETFE/PTFE composite membrane (with an ETFE content of 15 wt %) that was 10.9 g/m² with a MTS of 283 MPa in the longitudinal direction and 175 MPa in the transverse direction, giving a geometric mean MTS of 222 MPa. The matrix modulus in the longitudinal direction was 1738 MPa and in the transverse direction was 1078 MPa, giving a geometric mean of 1369 MPa.

Comparative Example 6

A section of the dried extrudate according to Example 6 was placed in a biaxial tenter frame containing two ovens to produce a biaxially stretched, porous membrane. After heating the restrained tape at 250° C. (i.e., below the ETFE melting point), the tape was stretched 10:1 in the longitudinal direction followed by 10:1 in the transverse direction. This ePTFE composite membrane was then sintered at 365° C. (i.e., above the PTFE melting point), for 60 seconds. This produced a porous membrane that was 6.3 g/m² with a MTS of 158 MPa in the longitudinal direction and 84 MPa in the transverse direction, giving a geometric mean MTS of 108 MPa. The matrix modulus in the longitudinal direction was determined to be 1263 MPa and 337 MPa in the transverse direction, giving a geometric mean matrix modulus of 652 MPa.

Example 13

The above samples were evaluated for tensile strength and dimensional stability, the results of which are presented in Tables 1 and 2, respectively.

TABLE 1

| | Tensile Strength | | | | |
|---|---|---|---|---|---|
| Example | mass/ area (g/m²) | thickness (μm) | Geometric Mean MTS (MPa) | Geometric Mean Matrix Modulus (MPa) | Ratio of Matrix Modulus to MTS |
| Example 7 | 6.2 | 18.9 | 130 | 1439 | 11.1 |
| Example 10 | 13.6 | 67.8 | 88 | 1202 | 13.7 |
| Example 11 | 13.9 | 21.9 | 107 | 1528 | 14.3 |
| Example 9 | 5.9 | 87.6 | 109 | 1336 | 12.2 |
| Example 12 | 6.7 | 99.0 | 118 | 710 | 6.02 |
| Comp. Ex. 3 | 6.8 | 120 | 106 | 429 | 4.05 |
| Comp. Ex. 2 | 6.2 | 28.9 | 152 | 271 | 1.78 |
| Comp. Ex. 4 | 10.9 | 70.6 | 220 | 292 | 1.33 |
| Comp. Ex. 5 | 10.9 | 27.9 | 222 | 1369 | 6.17 |
| Comp. Ex. 6 | 6.3 | 22.9 | 108 | 652 | 6.04 |

TABLE 2

Dimensional Stability

| Example | Absolute Dimensional Change (%) |
|---|---|
| Example 7 | 0.19 |
| Example 9 | 0.88 |
| Example 10 | 0.75 |
| Example 11 | 0.11 |
| Example 12 | 0.29 |
| Comp. Ex. 2 | 6.54 |
| Comp. Ex. 3 | 14.7 |
| Comp. Ex. 4 | 8.82 |
| Comp. Ex. 5 | 9.58 |
| Comp. Ex. 6 | 1.86 |

Examples 14-18

Using the thermoplastics prepared in Examples 1, 3, and 5, varying co-coagulated composite resins of thermoplastic and PTFE were produced. These resins were then paste extruded in a manner similar to Example 6 or 7, but with varying conditions as one skilled in the art of paste extrusion could perform. Porous membranes were then expanded from these tapes by stretching below the melting point of the thermoplastic in the MD direction at the specified stretch ratio, and then above the melting point of the thermoplastic, but below 327° C. in the transverse direction to give final properties for geometric mean MTS, geometric mean matrix modulus, and the ratio of matrix modulus to MTS as listed in Table 3. Composite resins of Examples 14-18 included the longitudinal expansion being performed below the thermoplastic melting point with the subsequent transverse expansion performed above the thermoplastic melting point but below the PTFE melting point. Comparative Examples 7-9, which contained no thermoplastic, required heat treatment for 60 seconds at 365° C. to produce a dimensionally stable membrane.

TABLE 3

Geometric Mean MTS

| Example | Thermoplastic Source Example (Resin) | Weight % Thermoplastic in Blended Resin | MD Stretch Ratio | TD Stretch Ratio | Geo. Mean MTS (MPa) | Geo. Mean Matrix Modulus (MPa) | Ratio of Matrix Modulus to MTS |
|---|---|---|---|---|---|---|---|
| Comp. Ex. 7 | 2 (PTFE) | 0 | 10 | 10 | 344.5 | 766 | 2.2 |
| Comp. Ex. 8 | 2 (PTFE) | 0 | 10 | 5 | 235.1 | 599 | 2.6 |
| Comp. Ex. 9 | 2 (PTFE) | 0 | 10 | 10 | 151.3 | 271 | 1.8 |
| Example 14 | 3 (mPCTFE/PTFE) | 40 | 10 | 10 | 112.8 | 1862 | 16.5 |
| Example 15 | 3 (mPCTFE/PTFE) | 40 | 10 | 5 | 96.2 | 1004 | 10.4 |
| Example 16 | 3 (mPCTFE/PTFE) | 40 | 5 | 10 | 120.6 | 2343 | 19.4 |
| Example 17 | 4 (ETFE/PTFE) | 40 | 10 | 10 | 95.1 | 1039 | 10.9 |
| Example 18 | 4 (ETFE/PTFE) | 40 | 5 | 10 | 70.9 | 822 | 11.6 |

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:
1. A method of forming an expanded composite ePTFE membrane comprising:
   providing a blend including
      40 wt % to 79.9 wt % of a plurality of fibrillatable polytetrafluoroethylene (PTFE) particles having a first melting point and
      20.1 wt % to 60 wt % of a plurality of thermoplastic polymer particles having a second melting point that is less than the first melting point;
   forming the blend into a tape;
   expanding the tape in a first direction below the second melting point to form an expanded tape; and
   expanding the expanded tape in a second direction above the second melting point but below the first melting point to form an ePTFE composite membrane,
      wherein the expanding occurs at temperatures below the first melting point such that the ePTFE composite membrane is not sintered
      wherein the membrane has a geometric mean matrix modulus to geometric mean matrix tensile strength ratio of at least about 6,
   wherein the geometric mean matrix modulus to geometric mean matrix tensile strength ratio is determined by

Ratio of geometric mean matrix modulus to geometric mean matrix tensile strength=geometric mean matrix modulus/geometric mean matrix tensile strength, wherein
      the geometric mean matrix modulus is calculated as √(longitudinal matrix modulus*transverse matrix modulus),
      wherein each, the longitudinal matrix modulus and the transverse matrix modulus at a 3% strain, are calculated as
      matrix modulus=(matrix tensile stress at 3% strain)/(0.03), wherein matrix tensile stress at 3% strain=(load at 3% strain/cross-sectional area)*(density of resin/density of the membrane),
and wherein the density of resin is 2.177 g/mL as determined by Helium pycnometry, and density of the membrane is calculated according to:

$$\rho = m/w*l*t$$

wherein ρ=density (g/cc),
m=mass (g)
w=width (9.05 cm),
l=length (5.08 cm),
and t=thickness (cm).

2. The method of claim 1, wherein the expansion steps are performed sequentially.

3. The method of claim 1, wherein the expansion steps are performed simultaneously.

4. The method of claim 1, wherein the thermoplastic polymer is a thermoplastic fluoropolymer.

5. The method of claim 4, wherein the thermoplastic fluoropolymer is selected from poly(ethene-co-tetrafluoroethene) (ETFE), polyvinylidene difluoride (PVDF), polychlorotrifluoroethylene (PCTFE), fluorinated ethylene propylene (FEP), and combinations thereof.

6. The method of claim 1, wherein the fibrillatable PTFE particles and the thermoplastic polymer particles each have an average particle size of less than 1 μm.

7. A method of forming a biaxially expanded composite ePTFE membrane comprising:
providing a blend including:
a first plurality of particles, the first plurality of particles comprising fibrillatable polytetrafluoroethylene (PTFE) particles having an average particle size of less than 1 μm;
a second plurality of particles, the second plurality of particles comprising thermoplastic polymer particles having an average particle size of less than 1 μm,
wherein the melting point of the thermoplastic polymer particles is less than the melting point of the fibrillatable PTFE particles,
wherein the blend includes from 40 wt % to 79.9 wt % fibrillatable PTFE particles and from 20.1 wt % to 60 wt % thermoplastic polymer particles;
paste extruding the blend in a lubricant to form a calendared tape;
drying the calendared tape to remove the lubricant to produce a dried calendared tape;
expanding the dried calendared tape in a first direction at a temperature below the melting point of the thermoplastic polymer to form a uniaxially expanded ePTFE composite membrane;
heating the uniaxially expanded porous membrane to a temperature greater than the melting point of the thermoplastic polymer and less than the melting point of the fibrillatable PTFE; and,
expanding the uniaxially expanded porous membrane in a second direction, wherein the second direction is different from the first direction, to form a biaxially expanded ePTFE composite membrane,
wherein the biaxially expanded ePTFE composite membrane is not sintered, and wherein the membrane has a geometric mean matrix modulus to geometric mean matrix tensile strength ratio of at least about 6,
wherein the geometric mean matrix modulus to geometric mean matrix tensile strength ratio is determined by Ratio of geometric mean matrix modulus to geometric mean matrix tensile strength=geometric mean matrix modulus/geometric mean matrix tensile strength, wherein
the geometric mean matrix modulus is calculated as
√(longitudinal matrix modulus*transverse matrix modulus),
wherein each, the longitudinal matrix modulus and the transverse matrix modulus at a 3% strain, are calculated as
matrix modulus=(matrix tensile stress at 3% strain)/(0.03), wherein
matrix tensile stress at 3% strain=(load at 3% strain/cross-sectional area)*(density of resin/density of the membrane),
and wherein the density of resin is 2.177 g/mL as determined by Helium pycnometry, and density of the membrane is calculated according to:

$$\rho = m/w*l*t$$

wherein ρ=density (g/cc),
m=mass (g),
w=width (9.05 cm),
l=length (5.08 cm),
and t=thickness (cm).

8. The method of claim 7, wherein the expansion steps are performed sequentially.

9. The method of claim 7, wherein the expansion steps are performed simultaneously.

10. An unsintered biaxially ePTFE composite membrane comprising:
from 40 wt % to 79.9 wt % fibrillatable polytetrafluoroethylene (PTFE) particles;
from 20.1 wt % to 60 wt % thermoplastic polymer particles;
a plurality of nodes interconnected by fibrils,
wherein the fibrils include ePTFE and the nodes include a higher thermoplastic polymer content than the total thermoplastic polymer content of the ePTFE composite membrane; and
a geometric mean matrix modulus to geometric mean matrix tensile strength ratio of at least about 6,
wherein the geometric mean matrix modulus to geometric mean matrix tensile strength ratio is determined by Ratio of geometric mean matrix modulus to geometric mean matrix tensile strength=geometric mean matrix modulus/geometric mean matrix tensile strength, wherein
the geometric mean matrix modulus is calculated as
√(longitudinal matrix modulus*transverse matrix modulus),
wherein each, the longitudinal matrix modulus and the transverse matrix modulus at a 3% strain, are calculated as
matrix modulus=(matrix tensile stress at 3% strain)/(0.03), wherein
matrix tensile stress at 3% strain=(load at 3% strain/cross-sectional area)*(density of resin/density of the membrane), and wherein the density of resin is 2.177 g/mL as determined by Helium pycnometry, and density of the membrane is calculated according to:

$$\rho = m/w*l*t$$

wherein ρ=density (g/cc),
m=mass (g),
w=width (9.05 cm),
l=length (5.08 cm),
and t=thickness (cm).

11. The membrane of claim 10, wherein the fibrils comprise at least about 85% of the ePTFE.

12. The membrane of claim 10, wherein the nodes comprise at least about 51 wt % of the thermoplastic polymer.

13. The membrane of claim 10, wherein the ePTFE composite membrane has a dimensional change of less than 1.5% as measured by dynamic mechanical analysis (DMA) upon heating from 25° C. to 200° C. at a rate of 5° C./min and upon holding at 200° C. for 5 minutes.

14. The membrane of claim 10, wherein the thermoplastic polymer is selected from the group consisting of: poly (ethylene-co-tetrafluoroethene) (ETFE), polyvinylidene difluoride (PVDF), polychlorotrifluoroethylene (PCTFE), fluorinated ethylene propylene (FEP) perfluoroalkoxy (PFA) and combinations thereof.

* * * * *